US012586295B2

(12) United States Patent
Cho et al.

(10) Patent No.: US 12,586,295 B2
(45) Date of Patent: Mar. 24, 2026

(54) APPARATUS AND METHOD FOR GENERATING NEW VIEWPOINT IMAGE USING FEW-SHOT 2D IMAGES

(71) Applicant: KOREA INSTITUTE OF SCIENCE AND TECHNOLOGY, Seoul (KR)

(72) Inventors: Junghyun Cho, Seoul (KR); Ig Jae Kim, Seoul (KR); Seok Yeong Lee, Seoul (KR); Jun Yong Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 143 days.

(21) Appl. No.: 18/393,004

(22) Filed: Dec. 21, 2023

(65) Prior Publication Data

US 2025/0157137 A1    May 15, 2025

(30) Foreign Application Priority Data

Nov. 15, 2023    (KR) ........................ 10-2023-0157935

(51) Int. Cl.
*G06T 15/20* (2011.01)
*G06T 7/30* (2017.01)
*G06T 7/90* (2017.01)
*G06T 15/50* (2011.01)

(52) U.S. Cl.
CPC .............. *G06T 15/205* (2013.01); *G06T 7/30* (2017.01); *G06T 7/90* (2017.01); *G06T 15/506* (2013.01);
(Continued)

(58) Field of Classification Search
CPC ................. G06T 15/205; G06T 15/506; G06T 2207/10024; G06T 2207/20081; G06T 7/30; G06T 7/90
See application file for complete search history.

(56) References Cited

U.S. PATENT DOCUMENTS 10,950,037 B2    3/2021  Sunkavalli et al.
2018/0293711 A1*  10/2018  Vogels ................... G06F 17/10
(Continued)

FOREIGN PATENT DOCUMENTS

KR    10-2022-0126063 A    9/2022
KR    10-2023-0044148 A    4/2023
WO    WO 2022/026692 A1    2/2022

OTHER PUBLICATIONS

Niemeyer et al. "RegNeRF: Regularizing Neural Radiance Fields for View Synthesis from Sparse Inputs" *Proceedings of the IEEE/ CVF Conference on Computer Vision and Pattern Recognition.* 2022 (pp. 1-11).

(Continued)

*Primary Examiner* — Xiao M Wu
(74) *Attorney, Agent, or Firm* — NSIP Law

(57) ABSTRACT

The present disclosure relates to an apparatus and a method for generating an image, which may generate a new viewpoint image using few-shot 2D images and is characterized by extracting and learning albedo representing intrinsic color information from the few-show 2D input images, intrinsically decomposing a color value synthesized in the form of patch from a new viewpoint using the few-shot 2D input images and extracting patch-wise albedo during learning, perform geometric alignment necessary for pixel correspondence between a new viewpoint image and a selected 2D input image using a depth value synthesized in the form of patch from the new viewpoint, and generating the new viewpoint image by calculating an albedo consistency loss between the patch-wise albedo.

10 Claims, 8 Drawing Sheets

(52) U.S. Cl.
    CPC .............. *G06T 2207/10024* (2013.01); *G06T 2207/20081* (2013.01); *G06T 2207/20084* (2013.01)

(56)                    References Cited

U.S. PATENT DOCUMENTS

2020/0160593 A1* 5/2020 Gu ........................... G06T 7/90
2021/0012576 A1   1/2021 Riegler et al.
2022/0130111 A1* 4/2022 Martin Brualla ....... G06T 17/20

OTHER PUBLICATIONS

Chen et al. "Hallucinated Neural Radiance Fields in the Wild" *Proceedings of the IEEE/CVF Conference on Computer Vision and Pattern Recognition.* 2022 (pp. 12943-12952).
Lee et al. "ExtremeNeRF: Few-shot Neural Radiance Fields Under Unconstrained Illumination" arXiv preprint, arXiv:2303.11728v1 Mar. 21, 2023 (pp. 1-22).
Lee et al. "ExtremeNeRF: Few-shot Neural Radiance Fields Under Unconstrained Illumination" arXiv preprint, arXiv:2303.11728v2 Mar. 22, 2023 (pp. 1-22).
Jain, Ajay, et al., "Putting NeRF on a Diet: Semantically Consistent Few-Shot View Synthesis", Proceedings of the IEEE/CVF International Conference on Computer Vision, arXiv:2104.00677v1, Apr. 1, 2021, (15 Pages in English).
Korean Office Action Issued on Jul. 21, 2025, in Counterpart Korean Patent Application No. 10-2023-0157935 (1 Page in English, 1 Page in Korean).

* cited by examiner

FIG. 3

| | Name | Filter | Input | Output | Connectivity |
|---|---|---|---|---|---|
| Encoder | Conv1 | kernel=(4×4), strides=(2×2) | 32×32×3 | 32×32×3 | – |
| | (LeakyRelu-Conv2-BN) | kernel=(4×4), strides=(2×2) | 16×16×32 | 8×8×64 | – |
| | (LeakyRelu-Conv3-BN) | kernel=(4×4), strides=(2×2) | 8×8×64 | 4×4×128 | – |
| | (LeakyRelu-Conv4) | kernel=(4×4), strides=(2×2) | 4×4×128 | 2×2×256 | – |
| Decoder | (LeakyRelu-Deconv1-BN) | kernel=(4×4), strides=(2×2) | 2×2×256 | 4×4×128 | 4×4×128 |
| | (LeakyRelu-Deconv2-BN) | kernel=(4×4), strides=(2×2) | 4×4×256 | 8×8×64 | 8×8×64 |
| | (LeakyRelu-Deconv3-BN) | kernel=(4×4), strides=(2×2) | 8×8×128 | 16×16×32 | 16×16×32 |
| | (LeakyRelu-Deconv4) | kernel=(4×4), strides=(2×2) | 16×16×64 | 32×32×3 (albede) 32×32×1 (shading) | – |
| Color Prediction | AvgPool | kernel=(1×1) | 2×2×256 | 2×2×256 | – |
| | (LeakyRelu-Conv5) | kernel=(3×3), strides=(1×1) | 2×2×256 | 2×2×128 | – |
| | (LeakyRelu-Flatten-FC) | – | 2×2×128 | 3 | – |

FIG. 7
RegNeRF PRESENT DISCLOSURE
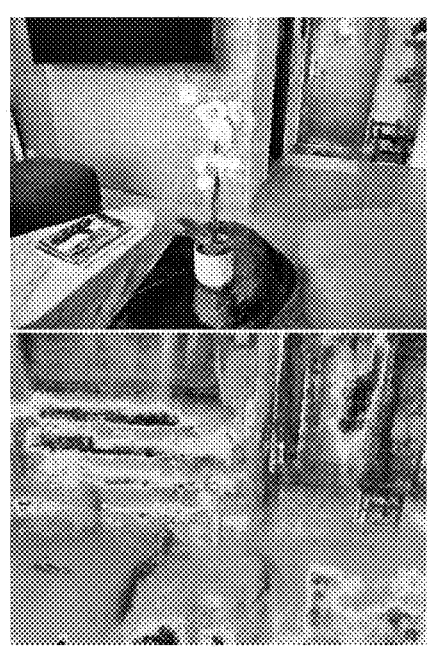 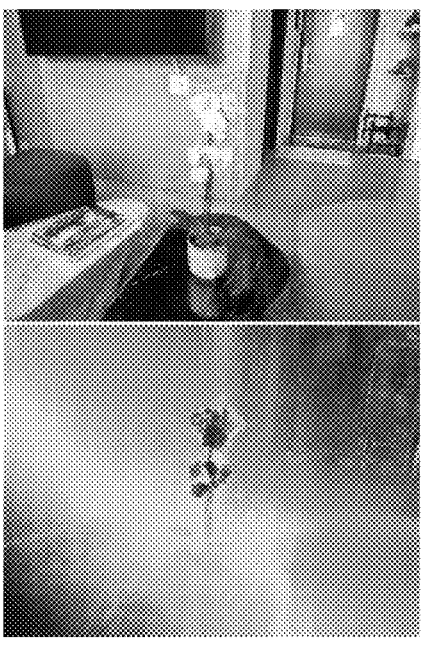

FIG. 8

| | CCRD ↓ | | Abs Rel ↓ | | PSNR ↑ | | SSIM ↑ | | LPIPS ↓ | |
| --- | --- | --- | --- | --- | --- | --- | --- | --- | --- | --- |
| | 3-view | 6-view | 3-view | 6-view | 3-view | 6-view | 3-view | 6-view | 3-view | 6-view |
| mip-NeRF | 18.27 | 17.43 | 0.32 | 0.30 | 12.92 | 13.83 | 0.26 | 0.30 | 0.55 | 0.49 |
| RegNeRF | 18.13 | 16.75 | 0.31 | 0.32 | 14.36 | 15.02 | 0.32 | 0.37 | 0.51 | 0.44 |
| PRESENT DISCLOSURE | 16.97 | 16.44 | 0.26 | 0.26 | 14.86 | 15.18 | 0.36 | 0.40 | 0.44 | 0.42 |

APPARATUS AND METHOD FOR GENERATING NEW VIEWPOINT IMAGE USING FEW-SHOT 2D IMAGES

CROSS-REFERENCE TO RELATED APPLICATIONS

This application claims the benefit under 35 USC 119(a) of Korean Patent Application No. 10-2023-0157935 filed on Nov. 15, 2023, in the Korean Intellectual Property Office, the entire disclosure of which is incorporated herein by reference for all purposes.

TECHNICAL FIELD

The present disclosure relates to an apparatus and a method for generating an image, and more specifically, to an apparatus and a method for generating an image, which may generate a new viewpoint image using few-shot 2D images.

EXPLANATION ON STATE-SUPPORTED RESEARCH AND DEVELOPMENT

This study was conducted with the support of hologram core technology development (R&D) of the Ministry of Science and ICT [(General) plenoptic-based hologram core technology development, (detail 1) development of ultra-high-resolution unstructured plenoptic video authoring/playback platform technology for medium and large spaces, project identification number: 1711193332, detailed project number: 2020-0-00457-004].

In addition, this study was conducted with the support of immersive content core technology development of the Ministry of Science and ICT [robust 3D object identification technology in varying view acceptable realistic images, project identification number: 1711196405, detailed project number: 00227592].

BACKGROUND ART

Recently, a technology called a neural radiance field (NeRF) has been attracting a lot of attention as a deep learning-based technology of restoring 3D objects or generating new viewpoint images from 2D images.

The NeRF may also generate images of views not provided as images when multi-view images are provided for 3D scenes (objects).

However, there is a limitation in that the NeRF requires a large number of input images (more than 100) and capturing conditions (lighting, contrast, and the like) of the input images should be matched.

Therefore, there is a problem in that it is difficult to generate high-quality new viewpoint images using only a small number of images collected or captured through the Internet or mobile phones in daily life.

In order to solve the problem, conventionally, a technology (e.g., RegNeRF) capable of generating new viewpoint images with only a small number of input images by reducing the number of input images or a technology (e.g., HA-NeRF) of not greatly degrading the qualities of the newly generated images even when the capturing conditions (lighting, contrast, and the like) of the input images are different have each been developed.

However, there is a problem in that in the case of the RegNeRF technology, when input images with different capturing conditions (lighting, contrast, and the like) are used, the qualities of the newly generated image are degraded, and in the case of the HA-NeRF technology, when a small number of input images are used, the qualities of the newly generated images are degraded.

DESCRIPTION OF THE INVENTION

Technical Problem

The present disclosure has been made in efforts to solve the conventional problems and is directed to providing an apparatus and a method for generating a new viewpoint image using few-shot 2D images, which may generate a reliable new viewpoint image using few-shot 2D images captured in different capturing conditions by generating the new viewpoint image by extracting intrinsic color information (albedo) in which lighting information is removed from color information synthesized from a new viewpoint and reflecting the extracted albedo.

Technical Solution

In order to achieve the object, an embodiment of the present disclosure provides an apparatus for generating a new viewpoint image using few-shot 2D images, the apparatus including: a full-image intrinsic decomposition unit configured to receive the few-shot 2D images, intrinsically decompose each input image, and extract albedo representing intrinsic color information from each 2D input image; a patch image intrinsic decomposition unit configured to learn using the albedo provided from the full-image intrinsic decomposition unit, and learn to minimize an albedo consistency loss, intrinsically decompose a color value synthesized in the form of patch from a new viewpoint using the few-shot 2D input images during learning, and extract patch-wise albedo; an alignment unit configured to perform geometric alignment necessary for pixel correspondence between a new viewpoint image and a 2D input image selected from the few-shot 2D input images using a depth value synthesized in the form of patch from the new viewpoint, calculate an albedo consistency loss between the albedo extracted by the full-image intrinsic decomposition unit and the patch-wise albedo extracted by the patch image intrinsic decomposition unit based on the pixel correspondence, and provide the albedo consistency loss to the patch image intrinsic decomposition unit; and an image generation unit configured to generate the new viewpoint image from the few-shot 2D input images by reflecting the patch-wise albedo extracted by the patch image intrinsic decomposition unit finishing learning.

In addition, in the apparatus for generating the new viewpoint image using the few-shot 2D images according to the present disclosure, the full-image intrinsic decomposition unit may intrinsically decompose each of the 2D input images offline using a given global context.

In addition, in the apparatus for generating the new viewpoint image using the few-shot 2D images according to the present disclosure, the alignment unit may perform geometric alignment by performing projective transformation based on the depth value synthesized in the form of patch from the new viewpoint.

In addition, in the apparatus for generating the new viewpoint image using the few-shot 2D images according to the present disclosure, the alignment unit may minimize inaccurate pixel correspondence by reflecting a depth consistency loss of the selected 2D input image.

In addition, in the apparatus for generating the new viewpoint image using the few-shot 2D images according to the present disclosure, the albedo consistency loss may be calculated by reflecting a weight term that minimizes a projection error.

In addition, in order to achieve the object, an embodiment of the present disclosure provides a method of generating a new viewpoint image using few-shot 2D images according to the present disclosure, the method including: a full-image intrinsic decomposing operation of receiving the few-shot 2D images, intrinsically decomposing each input image, and extracting albedo representing intrinsic color information from each 2D input image; a patch image intrinsic decomposing operation of learning using the albedo extracted in the full-image intrinsic decomposing operation, and learning to minimize an albedo consistency loss, intrinsically decomposing a color value synthesized in the form of patch from a new viewpoint using the few-shot 2D input images during learning, and extracting patch-wise albedo; an aligning operation of performing geometric alignment necessary for pixel correspondence between a new viewpoint image and a 2D input image selected from the few-shot 2D input images using a depth value synthesized in the form of patch from the new viewpoint, calculating an albedo consistency loss between the albedo extracted in the full-image intrinsic decomposing operation and the patch-wise albedo extracted in the patch image intrinsic decomposing operation based on the pixel correspondence, and provide the albedo consistency loss to the patch image intrinsic decomposing operation; and an image generating operation of generating the new viewpoint image from the few-shot 2D input images by intrinsically decomposing the color value synthesized in the form of patch from the new viewpoint using the few-shot 2D input images and reflecting the extracted patch-wise albedo, after the learning is finished.

In addition, in the method of generating the new viewpoint image using the few-shot 2D images according to the present disclosure, in the full-image intrinsic decomposing operation, each of the 2D input images may be intrinsically decomposed offline using a given global context.

In addition, in the method of generating the new viewpoint image using the few-shot 2D images according to the present disclosure, in the aligning operation, geometric alignment may be performed by performing projective transformation based on the depth value synthesized in the form of patch from the new viewpoint.

In addition, in the method of generating the new viewpoint image using the few-shot 2D images according to the present disclosure, in the aligning operation, inaccurate pixel correspondence may be minimized by reflecting a depth consistency loss of the selected 2D input image.

In addition, in the method of generating the new viewpoint image using the few-shot 2D images according to the present disclosure, the albedo consistency loss may be calculated by reflecting a weight term that minimizes a projection error.

Details of other embodiments are included in "Mode for Invention" and the accompanying "drawings."

Advantages and features of the present disclosure and methods for achieving them will become clear with reference to various embodiments described below in detail in conjunction with the accompanying drawings.

However, it should be noted that the present disclosure is not limited to only the configuration of each embodiment disclosed below but can be implemented in various different forms, each embodiment disclosed in the specification are merely provided to make the disclosure of the present disclosure complete and fully inform those skilled in the art to which the present disclosure pertains of the scope of the present disclosure, and the present disclosure is only defined by the scope of the claims.

Effects of the Invention

According to the present disclosure, by generating a new viewpoint image by extracting albedo representing albedo in which lighting information is removed from color information synthesized from a new viewpoint and reflecting the extracted albedo, it is possible to generate a reliable new viewpoint image using few-shot 2D images captured in different capturing conditions.

BRIEF DESCRIPTION OF DRAWINGS

FIG. 3 is a view exemplarily illustrating a structure of the patch image intrinsic decomposition unit applied to the present disclosure.

FIG. 7 is a view exemplarily illustrating new viewpoint images and depth maps generated according to the present disclosure.

FIG. 8 is a view exemplarily illustrating a result of comparing performance of the present disclosure and the related art.

SPECIFIC DETAILS FOR IMPLEMENTING THE INVENTION

Figure 1:
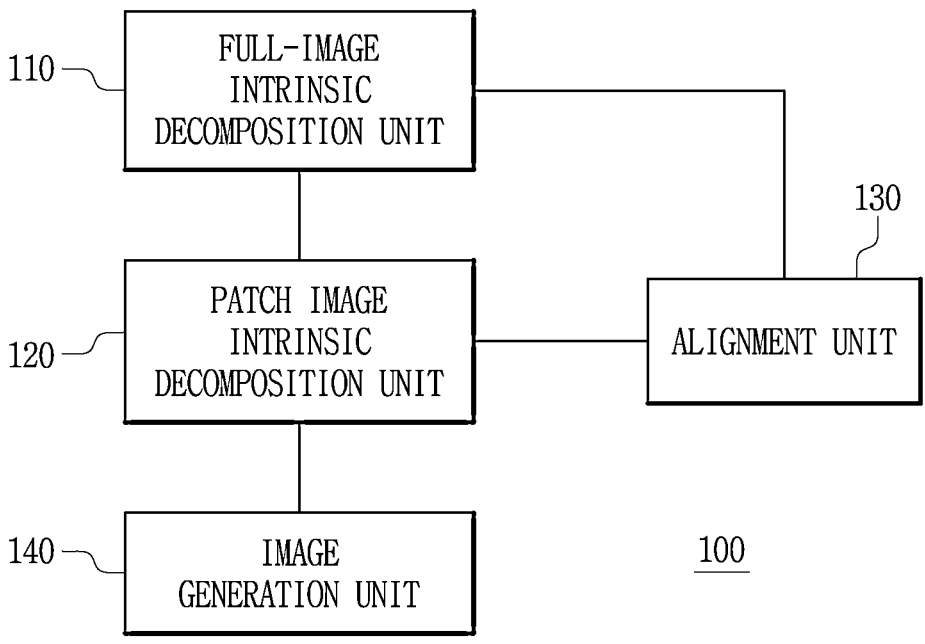
FIG. 1 is a view schematically illustrating a configuration of an apparatus for generating a new viewpoint image using few-shot 2D images according to one embodiment of the present disclosure.

Before specifically describing the present disclosure, it should be noted that the terms or words used in the specification should not be construed as unconditionally limited to their ordinary or dictionary meanings, the inventors of the present disclosure can appropriately define and use the concepts of various terms to describe their inventions in the best mode, and furthermore, these terms or words should be construed as meanings and concepts consistent with the technical spirit of the present disclosure.

In other words, it should be noted that the terms used in the specification are only used to describe exemplary embodiments of the present disclosure and are not used with the intention of specifically limiting the contents of the present disclosure, and these terms are terms defined in consideration of various possibilities of the present disclosure.

In addition, in the specification, it should be noted that singular expressions may include plural expressions unless the context clearly dictates otherwise, and even when similarly expressed in plural, they may include singular meanings.

Throughout the specification, when a certain component is described as "including" another component, it may mean that the certain component may further include any other components rather than precluding any other components unless specifically stated to the contrary.

Furthermore, when a certain component is described as being "present therein or installed to be connected to" another component, it should be noted that this component may be installed in direct connection or in contact with another component and installed to be spaced a predetermined distance from another component, when this component is installed to be spaced the predetermined distance from another component, a third component or unit for fixing or connecting the corresponding component to another component may be present, and description of the third component or unit may be omitted.

On the other hand, when a certain component is described as being "directly connected" or "directly coupled" to another component, it should be understood that no third component or unit is present.

Likewise, other expressions that describe the relationship between components, such as "between" and "immediately between," or "neighboring" and "directly neighboring," have the same meaning.

In addition, in the specification, when terms such as "one surface," "the other surface," "one side," "the other side," "first," and "second," are used, it should be noted that one component is used to clearly distinguish one component from another component, and the meaning of the corresponding component is not limitedly used by these terms.

In addition, in the specification, when terms related to position such as "top," "bottom," "left," and "right," are used, it should be understood that the terms represent the relative positions of the corresponding components in the corresponding drawings, and unless absolute positions of these positions are specified, these position-related terms should not be understood as representing the absolute positions.

Furthermore, in the specification of the present disclosure, when terms such as " . . . unit," " . . . machine," "module," and "device," are used, it should be noted that these terms mean units capable of processing one or more functions or operations, which can be implemented by hardware, software, or a combination of hardware and software.

In addition, in the specification, when each component in each drawing is denoted by a reference numeral, the same reference numeral indicates the same component throughout the specification so that the same component has the same reference number even when this component is illustrated in different drawings.

In the accompanying drawings of the specification, sizes, positions, connection relationship, and the like of components constituting the present disclosure may be described by being partially exaggerated, reduced, or omitted in order to sufficiently clearly convey the spirit of the present disclosure or for convenience of description, and thus proportions or scales thereof may not be precise.

In addition, hereinafter, in describing the present disclosure, detailed descriptions of configurations that it is determined to unnecessarily obscure the gist of the present disclosure, for example, known technologies including the related art may be omitted.

Hereinafter, an apparatus and a method for generating a new viewpoint image using few-shot 2D images according to exemplary embodiments of the present disclosure will be described in detail with reference to the accompanying drawings.

Before describing an apparatus and a method for generating a new viewpoint image using few-shot 2D images according to the present disclosure, a technology required to implement the present disclosure will be first described.

First, NeRF receives 5-dimensional 3D positions and 2D direction data as inputs and generates new viewpoint images based on a volume rendering technology of deriving an RGB color c value and a volume density $\sigma$ as an output.

Specifically, a view-dependent color $\hat{c}(x)$ may be rendered as expressed in Equation 1 using a ray $r_x(t) = o + td_x$ here, o, $d_x$, and t denote a camera origin, a ray direction, and a scene bounded to a pixel position x, respectively).

$$\hat{c}(x) = \int_{t_n}^{t_f} T(t)\sigma(t)c(t)dt, \qquad \text{[Equation 1]}$$

$$T(t) = \exp\left(-\int_{t_n}^{t} \sigma(s)ds\right)$$

and $\sigma(\bullet)$, $c(\bullet)$ denote density and color predictions from a network, respectively.

Likewise, a depth value $\hat{d}(x)$ at x may be rendered as expressed in Equation 2.

$$\hat{d}(x) = \int_{t_n}^{t_f} T(t)\sigma(t)tdt. \qquad \text{[Equation 2]}$$

View synthesis may be performed by optimizing a mean squared error on a synthesized color as expressed in Equation 3.

$$\mathcal{L}_{color} = \sum_{x \in S} \|\hat{c}(x) - c_{gt}(x)\|_2^2, \qquad \text{[Equation 3]}$$

Here, S denotes a set of sampled pixels, and $c_{gt}(x)$ denotes a ground-truth color at x.

RegNeRF is a technology capable of generating new viewpoint images from few-shot input images and uses depth smoothness regularization of a novel new synthesized patch for few-shot view synthesis defined as in Equation 4.

$$\mathcal{L}_{ds} = \sum_{x \in S} \sum_{l \in N(x)} \left(\hat{d}(l) - \hat{d}(x)\right)^2, \qquad \text{[Equation 4]}$$

Here, $\hat{d}(x)$ denotes a depth value of the synthesized image at x, and l denotes one of four-neighbor adjacent pixels $\mathcal{N}(x)$.

It is possible to improve corrupted shapes of the synthesized scene through regularization.

Meanwhile, the present disclosure is intended to generate a reliable new viewpoint image using only few-shot 2D images while a lighting condition collected in daily life through Internet, cell phones, or the like is not restricted, and the reliable new viewpoint image may be generated by extracting intrinsic color information (albedo) independent of views and lighting and performing a direct shape comparison between input view images and the new viewpoint images under non-restricted lighting by reflecting the extracted albedo.

To this end, since the pixel-to-pixel correspondence between different views is required, geometric alignment is required to select pixels to compare.

In addition, since a non-intersecting or occluded region is present between the new viewpoint image and the input view image, this region should be considered during cross-view regularization.

In addition, since massive calculation and memory are required for consecutive ray sampling for the entire image, this is processed patch by patch.

FIG. 1 is a view schematically illustrating a configuration of an apparatus for generating a new viewpoint image using few-shot 2D images according to one embodiment of the present disclosure.

As illustrated in FIG. 1, an apparatus 100 for generating a new viewpoint image using few-shot 2D images according to one embodiment of the present disclosure may include a full-image intrinsic decomposition unit 110, a patch image intrinsic decomposition unit 120, an alignment unit 130, an image generation unit 140, and the like.

In this configuration, the full-image intrinsic decomposition unit 110 may receive few-shot 2D images, intrinsically decompose each image, and extract albedo from each 2D input image.

Specifically, the full-image intrinsic decomposition unit 110 may intrinsically decompose each of the 2D input images and extract intrinsic image information, such as intrinsic color information, shading, shadowing, and lighting, which is a pure color information in which lighting information is removed from each 2D input image.

In addition, an intrinsic image implemented with only the albedo representing intrinsic color information among the extracted intrinsic image information may be generated.

The intrinsic image implemented with only the albedo in which the lighting information is removed may be independent of lighting unlike the RGB input images.

Here, the 2D images input to the full-image intrinsic decomposition unit 110 as an input image may be images collected under various lighting conditions.

The full-image unique decomposition unit 110 may intrinsically decompose each 2D input image using a given global context and extract intrinsic image information from each 2D input image.

In addition, since massive calculation and memory are required when the intrinsic image information is extracted from each 2D input image, the full-image intrinsic decomposition unit 110 may perform intrinsic decomposition offline.

The full-image intrinsic decomposition unit 110 may be implemented as a full-image intrinsic decomposition network (FIDNet).

When the full-image intrinsic decomposition unit 110 is implemented as FIDNet, the full-image intrinsic decomposition unit 110 may be composed of a shared encoder and two decoders (one for log-scale albedo and the other one for image shading), and for example, 256×384 sized full resolution images may be used as inputs.

The full-image intrinsic decomposition unit 110 may predict a 3D light color c as a by-product.

The full-image intrinsic decomposition unit 110 may provide albedo among the extracted intrinsic image information to the patch image intrinsic decomposition unit 120 so that the patch image intrinsic decomposition unit 120 may learn using this.

The patch image intrinsic decomposition unit 120 may learn using the albedo provided from the full-image intrinsic decomposition unit 110.

When learning using the albedo provided from the full-image intrinsic decomposition unit 110, the patch image intrinsic decomposition unit 120 preferably learns to minimize an albedo consistency loss $\mathcal{L}_{ac}$.

During learning, the patch image intrinsic decomposition unit 120 may intrinsically decompose a color value synthesized in the form of patch from a new viewpoint using few-shot 2D input images and extract patch-wise albedo.

Figure 2:
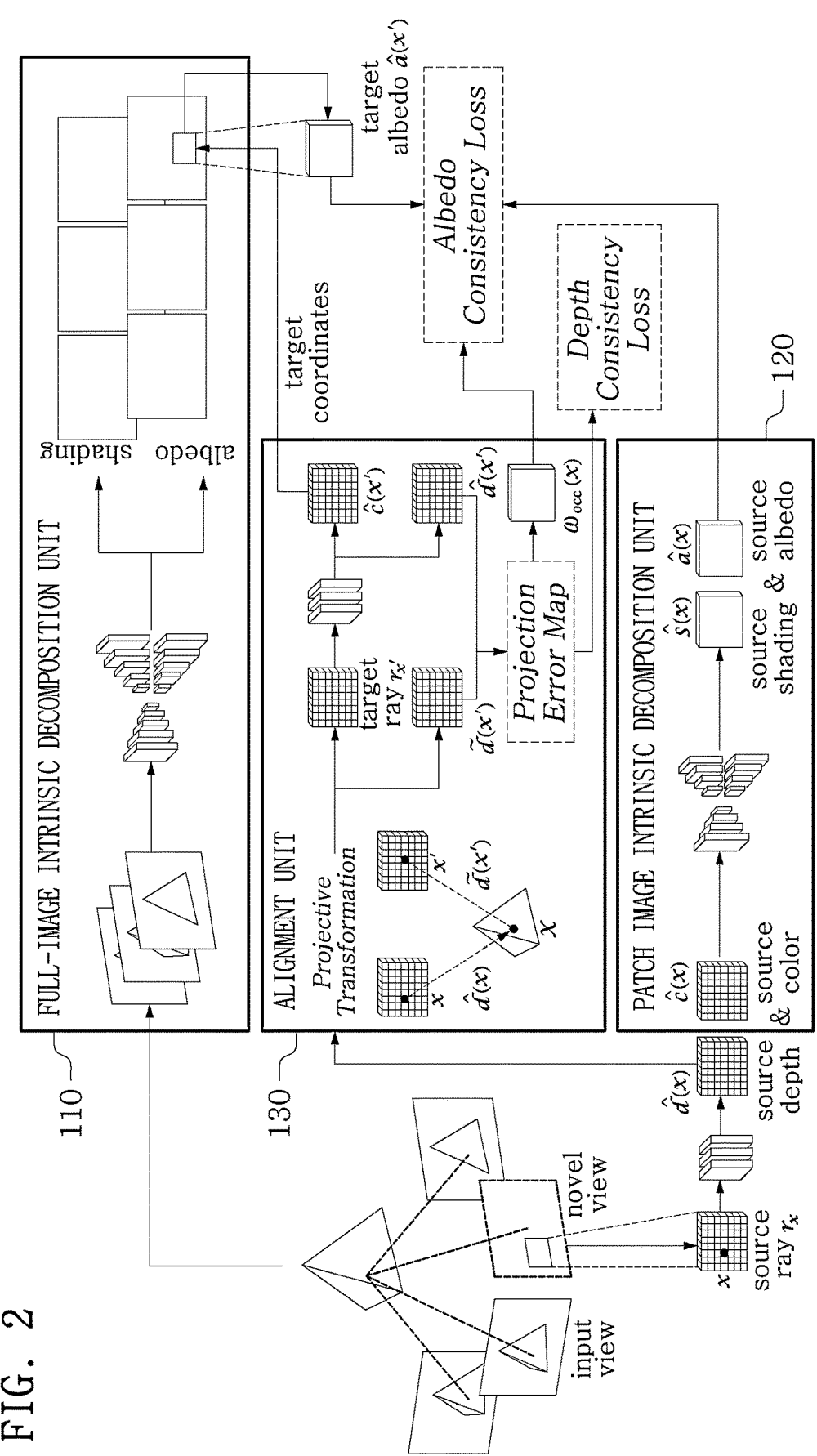
FIG. 2 is a view schematically illustrating a configuration of a full-image unique decomposition unit, a patch image intrinsic decomposition unit, and an alignment unit applied to the present disclosure.

Specifically, as illustrated in FIG. 2, as an example, the patch image intrinsic decomposition unit 120 may receive a color value $\hat{c}(x)$ among the color value $\hat{c}(x)$ and a depth value $\hat{d}(x)$ synthesized in the form of patch from the new viewpoint by multi-layer perception (MLP), intrinsically decompose the color value, and extract intrinsic image information, such as albedo $\hat{a}(x)$, shading $\hat{s}(x)$, shadowing, and lighting, from the corresponding color value.

In addition, an intrinsic image implemented with only the albedo among the extracted intrinsic image information may be generated.

Here, the MLP may receive 5-dimensional 3D positions and 2D direction data as inputs, synthesize the color value $\hat{c}(x)$ and the depth value $\hat{d}(x)$ viewed from the corresponding position in the form of patch, and output the synthesized value.

Since massive calculation and memory are required when the patch image intrinsic decomposition unit 120 performs intrinsic decomposition on full images, the patch image intrinsic decomposition unit 120 can be implemented to receive the color value synthesized in the form of patch and perform intrinsic decomposition.

The patch image intrinsic decomposition unit 120 may be implemented as a patch-wise intrinsic decomposition network (PIDNet).

When the patch image intrinsic decomposition unit 120 is implemented as PIDNet, as an example, as illustrated in FIG. 3, the patch image intrinsic decomposition unit 120 may be composed of four 4×4 sized convolution/deconvolution layers connected to each other using skip connection and additional fully connected layers for light color prediction.

The patch image intrinsic decomposition unit 120 may use, for example, a 32×32 sized patch as an input.

Decoders for albedo and shading are the same as the full-image intrinsic decomposition unit 110 except for the last channel dimension (3 for the albedo and 1 for the shading image).

Meanwhile, the alignment unit 130 may perform geometric alignment necessary for pixel correspondence between the new viewpoint image and a 2D input image randomly selected 2D input image from the few-shot 2D input images using the depth value $\hat{d}(x)$ synthesized in the form of patch from the new viewpoint, calculate the albedo consistency loss between the albedo extracted by the full-image intrinsic decomposition unit 110 and the patch-wise albedo extracted by the patch image intrinsic decomposition unit 120 based on the pixel correspondence, and provide the albedo consistency loss to the patch image intrinsic decomposition unit 120.

The patch image intrinsic decomposition unit 120 receiving the albedo consistency loss from the alignment unit 130 may learn in a direction of minimizing the albedo consistency loss with reference to the albedo consistency loss received from the alignment unit 130.

As described above, the alignment unit 130 may perform the geometric alignment for the pixel-to-pixel correspondence between different views (new viewpoint-input).

As illustrated in FIG. 2, when a pair of images is selected from the inputs and the randomly generated new viewpoints for every iteration, the alignment unit 130 uses projective transformation to obtain the pixel correspondence between the selected image pair.

When a pixel x is given from the new viewpoint, the corresponding image pixel x' of the input view depicting the same 3D position is required.

When a depth value at the given image pixel x is known, the pixel x' may be obtained by using the projective transformation as expressed in Equation 5.

$$x' = \left( K T'^{-1} T \right) d(x) K^{-1} x, \qquad \text{[Equation 5]}$$

Here, K denotes camera intrinsics, T and T' denote camera-to-world matrices, and both K and T may be provided for calibrated images.

As described above, when the pixel x' of the input view corresponding to the pixel x of the new viewpoint is acquired by using the projective transformation, image consistency can be achieved between the input views and the new viewpoints based on the pixel correspondence.

Since the lighting conditions of the 2D input images used in the present disclosure are not limited, that is, the lighting conditions of the 2D input images are diverse, it is not possible to regularize the view-dependent color through Equation 3.

Therefore, in the embodiment of the present disclosure, the view-dependent color may be regularized by using the L2 normalized albedo consistency loss $\mathcal{L}_{ac}$ defined as expressed in Equation 6.

$$\mathcal{L}_{ac} = \sum_{x \in \mathcal{P}} \omega_{occ}(x) \| \hat{a}(x) - \hat{a}(x') \|_2^2, \qquad \text{[Equation 6]}$$

Here, â(x) and â(x') denote the extracted albedo at pixel x of the new viewpoint and the pixel x' of the input view, respectively.

In addition, $w_{occ}(x)$ denotes a weight term for considering inaccurate correspondences coming from occlusions or out-of-region pixels, and $\mathcal{P}$ denotes all pixels of the new viewpoint.

Details of the weight term $w_{occ}(x)$ are as follows.

In Equation 5, d̃(x'), which is the depth value at the pixel x' of the input view, may be calculated as a by-product.

A synthesized depth value d̂(x') at x' should be equal to d̃(x') when there is neither self-occlusion or ill-synthesized floating artifacts.

For all cases, a projection error $\varepsilon_{proj}$ for x' may be defined as expressed in Equation 7.

$$\varepsilon_{proj} = \left( \hat{d}(x') - \tilde{d}(x') \right)^2. \qquad \text{[Equation 7]}$$

However, both inaccurate correspondence and occlusion may cause large projection errors.

In order to minimize the projection error $\varepsilon_{proj}$ due to the inaccurate correspondence while protecting the pair of pixels by occlusion, the weight term $w_{occ}$ on the pixel x of the input view may be defined as expressed in Equation 8.

$$\omega_{occ} = r_e \left( 1 - \mathcal{E}_{proj} / \mathcal{M}_{proj} \right), \qquad \text{[Equation 8]}$$

Here, $r_e$ and $\mathcal{M}_{proj}$ denote an error rate coefficient and a maximum value of $\varepsilon_{proj}(x)$, respectively.

When $w_{occ}$ is used, the input-novel view pairs with occlusion that are likely to have large projection errors are not enforced to have the albedo consistency.

$r_e$ may be reduced from 1 to an end criteria (0.5), thereby reducing the number of pairs enforced to have the same albedo. This is because the inaccurate correspondence pairs are reduced during learning.

In the present disclosure, when the geometric alignment is performed, incorrect synthesized depth values that are commonly observed in the new viewpoint synthesis may be used.

Therefore, in order to prevent the enforcement of the consistency between the pixels with inaccurate correspondence and efficiency correct ill-synthesized scene geometry, a depth consistency loss $\mathcal{L}_{dc}$ is presented.

The direct minimization of $\varepsilon_{proj}$ may be counterproductive due to occlusion by smoothing two unrelated surface depths.

Since the total variation normalization on the projection error can reduce better regularize the scene geometry, thereby successfully reducing floating artifacts without suffering adverse effects due to occlusion, the depth consistency loss $\mathcal{L}_{dc}$ of the input view may be defined as expressed in Equation 9.

$$\mathcal{L}_{dc} = \sum_{x' \in \mathcal{P}'} \sum_{y \in N(x')} \left( \mathcal{E}_{proj}(y) - \mathcal{E}_{proj}(x') \right)^2, \qquad \text{[Equation 9]}$$

Here, y denotes one of four-neighbor adjacent pixels $\mathcal{N}(x')$, and $\mathcal{P}'$ denotes all pixels of the input view.

In addition to the above-described albedo consistency loss $\mathcal{L}_{ac}$ and depth consistency loss $\mathcal{L}_{dc}$, an edge-preserving loss $\mathcal{L}_{edge}$ an intrinsic smoothness loss $\mathcal{L}_{pid}$, a chromaticity consistency loss $\mathcal{L}_{chrom}$, a color consistency loss $\mathcal{L}_{color}$, a depth smoothness loss $\mathcal{L}_{ds}$, and the like may be used together.

Here, the edge-preserving loss $\mathcal{L}_{edge}$ may have the constraint that a gradient of the novel synthesized view (i.e., an edge) are the same as a gradient of the input view.

The patch-wise intrinsic smoothness loss $\mathcal{L}_{pid}$ may be defined in the same manner as the depth consistency loss.

The patch-wise chromaticity consistency loss $\mathcal{L}_{chrom}$ may the constraint that the chromaticity of the input patch and the extracted albedo are the same.

Meanwhile, the image generation unit 140 may generate an image of the new viewpoint from the few-shot 2D input images by reflecting the patch-wise albedo extracted by the patch image intrinsic decomposition unit 120 finishing learning.

The image generation unit 140 may generate the image of the new viewpoint by applying a technology, for example, such as NeRF.

Figure 4:
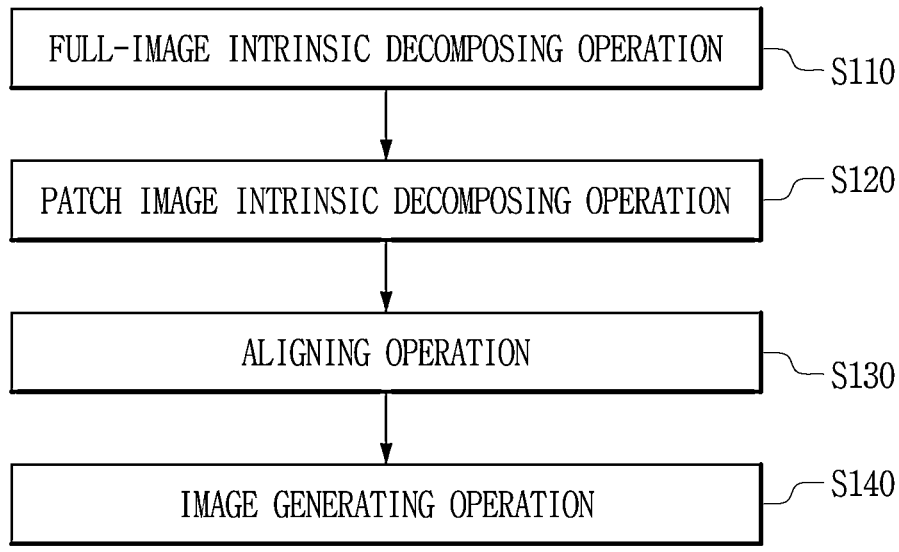
FIG. 4 is a flowchart for describing a method of generating a new viewpoint image using few-shot 2D images according to one embodiment of the present disclosure.

FIG. 4 is a flowchart for describing a method of generating a new viewpoint image using few-shot 2D images according to one embodiment of the present disclosure.

The method of generating the new viewpoint image using the few-shot 2D images according to one embodiment of the present disclosure may be performed on the configuration that is substantially the same as that of the apparatus 100 for generating the new viewpoint image using the few-shot 2D images illustrated in FIGS. 1 and 2.

First, in a full-image intrinsic decomposing operation S110, the few-shot 2D images may be received, each may be intrinsically decomposed, and the albedo may be extracted from each 2D input image.

Since the operation S110 requires massive calculation and memory for intrinsically decomposing each 2D input image and extracting intrinsic image information, the intrinsic decomposition on each 2D input image may be performed offline.

In addition, in the operation S110, when each 2D input image is intrinsically decomposed and the intrinsic image information is extracted, the intrinsic decomposition on each 2D input image may be performed by using the given global context.

Then, in a patch image intrinsic decomposing operation S120, learning may be performed by using the albedo extracted in the full-image intrinsic decomposing operation S110.

When the learning is performed in the patch image intrinsic decomposing operation S120, the learning may be performed to minimize the albedo consistency loss.

In addition, in the patch image intrinsic decomposing operation S120, during learning, the color value synthesized in the form of patch from the new viewpoint may be intrinsically decomposed by using the few-shot 2D input images, and the patch-wise albedo may be extracted.

Meanwhile, in an aligning operation S130, geometric alignment necessary for pixel correspondence between the new viewpoint image and the 2D input image selected from the few-shot 2D input images may be performed by using the depth value synthesized in the form of patch from the new viewpoint, the albedo consistency loss between the albedo extracted in the full-image intrinsic decomposing operation S110 and the patch-wise albedo extracted in the patch image intrinsic decomposing operation S120 based on the pixel correspondence may be calculated, and the albedo consistency loss may be provided to the patch image intrinsic decomposing operation S120.

In the patch image intrinsic decomposing operation S120, learning may be performed in a direction of minimizing the albedo consistency loss with reference to the albedo consistency loss received in the aligning operation S130.

In the aligning operation S130, the projective transformation may be performed based on the depth value synthesized in the form of patch from the new viewpoint, and the geometric alignment necessary for the pixel correspondence between the new viewpoint image and the selected 2D input image may be performed.

The above-described albedo consistency loss may be calculated by reflecting the weight term that minimizes the projection error in order to minimize the inaccurate pixel correspondence between the new viewpoint image and the selected 2D input image.

In the aligning operation S130, by reflecting the depth consistency loss of the selected 2D input image, it is possible to minimize the inaccurate pixel correspondence between the new viewpoint image and the selected 2D input image.

After learning is finished by repeatedly performing the operations S110 to S130, in an image generating operation S140, the new viewpoint image may be generated from the few-shot 2D input images by intrinsically decomposing the color value synthesized in the form of patch from the new viewpoint using the few-shot 2D input images and reflecting the extracted patch-wise albedo.

Specifically, in the image generating operation S140, when the new viewpoint image is generated by applying a technology such as NeRF, the new viewpoint image is generated by intrinsically decomposing the color value synthesized in the form of patch from the new viewpoint using the few-shot 2D input images, extracting the patch-wise albedo, and then reflecting the extracted patch-wise albedo for the reconstruction of the space information.

As described above, when the new viewpoint image is generated by reflecting the albedo, it is possible to provide the reliable synthesis result even when lighting is different and few-shot images are input.

Figure 5:
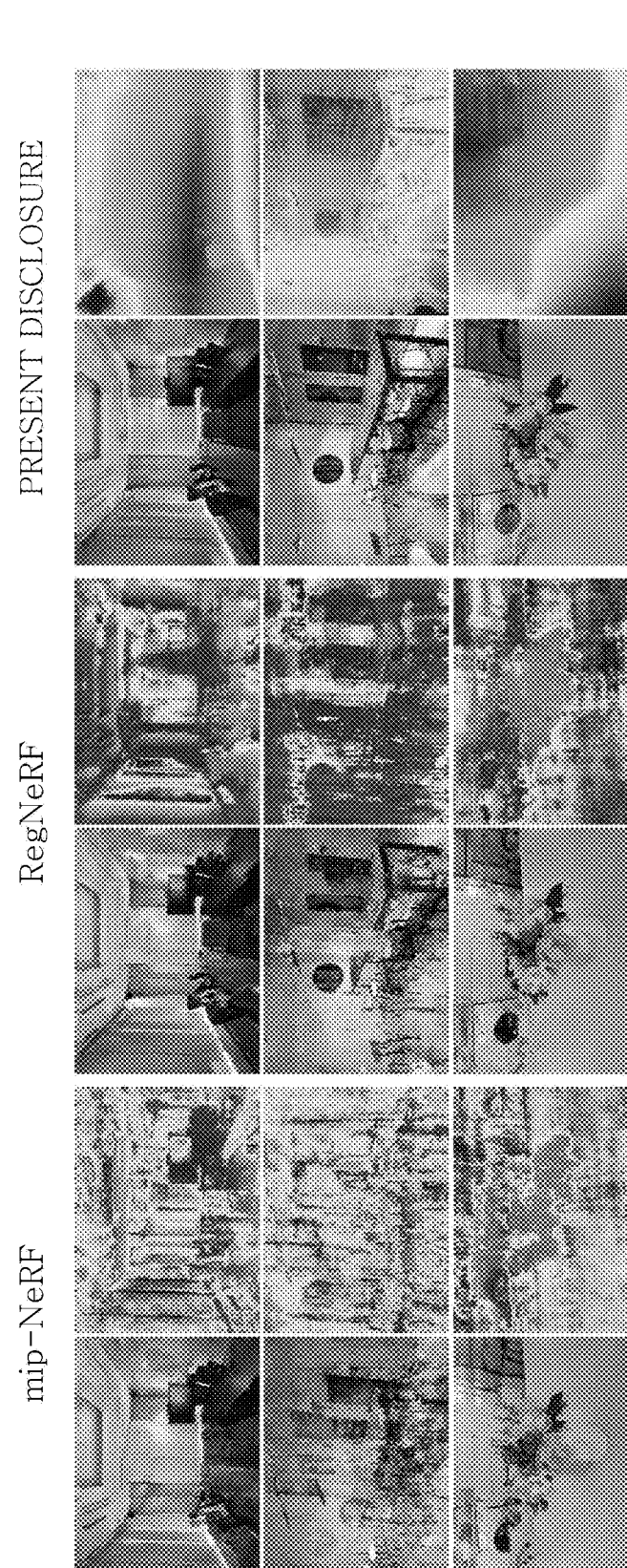
FIG. 5 is a view exemplarily illustrating new viewpoint images and depth maps generated according to the present disclosure.

FIG. 5 is a view exemplarily illustrating the new viewpoint images and the depth maps generated according to the present disclosure, and it can be seen that the reliable synthesis result can be obtained by comparing the new viewpoint images with the images generated according to the related art.

Figure 6:
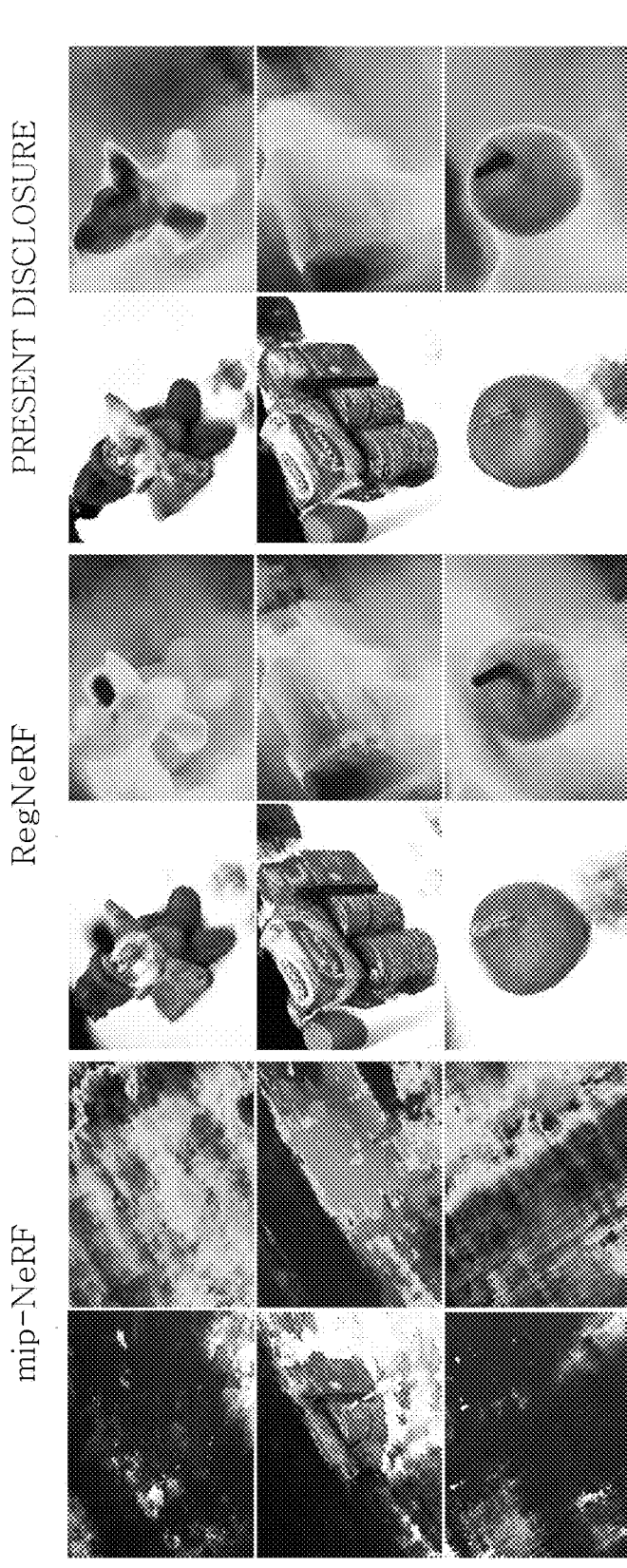
FIG. 6 is a view exemplarily illustrating new viewpoint images generated according to the present disclosure.

FIG. 6 is a view exemplarily illustrating the new viewpoint images generated according to the present disclosure, and it can be seen that when input images from three views varying depending on light are given, the images generated according to the present disclosure can obtain the reliable synthesis result compared to the images generated according to the related art.

FIG. 7 is a view exemplarily illustrating the new viewpoint images and the depth maps generated according to the present disclosure, and it can be seen that the images generated according to the related art and the images generated according to the present disclosure show similar results, but for the depth information, the depth maps generated according to the related art are distorted greatly.

FIG. 8 is a view illustrating a result of comparing the performance of the present disclosure and the related art, and it can be seen that the performance of the present disclosure has been improved.

Although various exemplary embodiments of the present disclosure have been descried above by giving some examples, the descriptions of various embodiments described in the "Mode for Invention" section are only illustrative, those skilled in the art to which the present disclosure pertains will easily understand that various modifications of the present disclosure can be carried out or equivalent embodiments of the present disclosure can be carried out from the above descriptions.

In addition, since the present disclosure can be implemented in various different forms, it should be noted that the present disclosure is not limited by the above description, the above description is to make the disclosed contents of the present disclosure complete and only provided to fully inform those skilled in the art to which the present disclosure pertains of the scope of the present disclosure, and the present disclosure is defined by the claims.

EXPLANATION OF SYMBOLS

100. apparatus,
110. full-image intrinsic decomposition unit,
120. patch image intrinsic decomposition unit,
130. alignment unit,
140. image generation unit

The invention claimed is:

1. An apparatus for generating a new viewpoint image using few-shot 2D images, comprising:

a full-image intrinsic decomposition unit configured to receive the few-shot 2D images, intrinsically decompose each input image, and extract albedo representing intrinsic color information from each 2D input image;

a patch image intrinsic decomposition unit configured to learn using the albedo provided from the full-image intrinsic decomposition unit, and learn to minimize an albedo consistency loss, intrinsically decompose a color value synthesized in the form of patch from a new viewpoint using the few-shot 2D input images during learning, and extract patch-wise albedo;

an alignment unit configured to perform geometric alignment necessary for pixel correspondence between a new viewpoint image and a 2D input image selected from the few-shot 2D input images using a depth value synthesized in the form of patch from the new viewpoint, calculate an albedo consistency loss between the albedo extracted by the full-image intrinsic decomposition unit and the patch-wise albedo extracted by the patch image intrinsic decomposition unit based on the pixel correspondence, and provide the albedo consistency loss to the patch image intrinsic decomposition unit; and an image generation unit configured to generate the new viewpoint image from the few-shot 2D input images by reflecting the patch-wise albedo extracted by the patch image intrinsic decomposition unit finishing learning.

2. The apparatus of claim 1, wherein the full-image intrinsic decomposition unit intrinsically decomposes each of the 2D input images offline using a given global context.

3. The apparatus of claim 1, wherein the alignment unit performs geometric alignment by performing projective transformation based on the depth value synthesized in the form of patch from the new viewpoint.

4. The apparatus of claim 1, wherein the alignment unit minimizes inaccurate pixel correspondence by reflecting a depth consistency loss of the selected 2D input image.

5. The apparatus of claim 1, wherein the albedo consistency loss is calculated by reflecting a weight term that minimizes a projection error.

6. A method of generating a new viewpoint image using few-shot 2D images, comprising:

a full-image intrinsic decomposing operation of receiving the few-shot 2D images, intrinsically decomposing each input image, and extracting albedo representing intrinsic color information from each 2D input image;

a patch image intrinsic decomposing operation of learning using the albedo extracted in the full-image intrinsic decomposing operation, and learning to minimize an albedo consistency loss, intrinsically decomposing a color value synthesized in the form of patch from a new viewpoint using the few-shot 2D input images during learning, and extracting patch-wise albedo;

an aligning operation of performing geometric alignment necessary for pixel correspondence between a new viewpoint image and a 2D input image selected from the few-shot 2D input images using a depth value synthesized in the form of patch from the new viewpoint, calculating an albedo consistency loss between the albedo extracted in the full-image intrinsic decomposing operation and the patch-wise albedo extracted in the patch image intrinsic decomposing operation based on the pixel correspondence, and provide the albedo consistency loss to the patch image intrinsic decomposing operation; and an image generating operation of generating the new viewpoint image from the few-shot 2D input images by intrinsically decomposing the color value synthesized in the form of patch from the new viewpoint using the few-shot 2D input images and reflecting the extracted patch-wise albedo, after the learning is finished.

7. The method of claim 6, wherein in the full-image intrinsic decomposing operation, each of the 2D input images is intrinsically decomposed offline using a given global context.

8. The method of claim 6, wherein in the aligning operation, geometric alignment is performed by performing projective transformation based on the depth value synthesized in the form of patch from the new viewpoint.

9. The method of claim 6, wherein in the aligning operation, inaccurate pixel correspondence is minimized by reflecting a depth consistency loss of the selected 2D input image.

10. The method of claim 6, wherein the albedo consistency loss is calculated by reflecting a weight term that minimizes a projection error.

* * * * *